US007259366B2

(12) United States Patent
Birk et al.

(10) Patent No.: US 7,259,366 B2
(45) Date of Patent: Aug. 21, 2007

(54) APPARATUS FOR THE DETECTION OF PHOTONS OF A LIGHT BEAM HAVING A THREE-DIMENSIONAL ARRAY OF DETECTORS

(75) Inventors: Holger Birk, Meckesheim (DE); Rafael Storz, Heidelberg (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 29 days.

(21) Appl. No.: 10/568,002

(22) PCT Filed: Apr. 2, 2004

(86) PCT No.: PCT/DE2004/000718

§ 371 (c)(1),
(2), (4) Date: Feb. 10, 2006

(87) PCT Pub. No.: WO2005/015284

PCT Pub. Date: Feb. 17, 2005

(65) Prior Publication Data

US 2006/0215264 A1    Sep. 28, 2006

(30) Foreign Application Priority Data

Aug. 12, 2003  (DE) .................. 103 37 344
Jan. 26, 2004  (DE) ............... 10 2004 003 993

(51) Int. Cl.
    *H01L 31/00* (2006.01)
(52) U.S. Cl. .................. 250/214.1; 250/208.1
(58) Field of Classification Search ............ 250/214.1, 250/208.1, 216, 239; 348/272–276, 281, 348/282
    See application file for complete search history.

(56) References Cited

U.S. PATENT DOCUMENTS

| 5,834,782 | A | * | 11/1998 | Schick et al. .......... 250/370.11 |
| 5,886,784 | A |   | 3/1999  | Engelhardt .................. 356/326 |
| 6,097,485 | A |   | 8/2000  | Lievan ....................... 356/338 |
| 6,582,903 | B1 |  | 6/2003  | Rigler et al. .................. 435/6 |

FOREIGN PATENT DOCUMENTS

| EP | 1 115 021   | 7/2001 |
| JP | 080 43 739  | 2/1996 |
| WO | WO 01/09592 | 2/2004 |

\* cited by examiner

*Primary Examiner*—Que T Le
(74) *Attorney, Agent, or Firm*—Darby & Darby

(57) ABSTRACT

An apparatus for detecting photons of a light beam emanating from a spatially limited source includes a detection device having a plurality of detectors forming a three-dimensional array with semitranslucent EMCCDs disposed one behind another. A light splitting device is disposed in a path of rays of the light beam for splitting the light beam so as to distribute the photons over the detectors for detection.

18 Claims, 4 Drawing Sheets

APPARATUS FOR THE DETECTION OF PHOTONS OF A LIGHT BEAM HAVING A THREE-DIMENSIONAL ARRAY OF DETECTORS

The present invention relates to a device for detecting photons of a light beam emanating from a spatially limited source, in particular for use in a fluorescence microscope, including a detection device.

BACKGROUND

In fluorescence microscopy in particular, the signal-to-noise ratio is a critical parameter due to the generally relatively low intensity of the fluorescence signals. This ratio is determined by the number of photons impinging on the detector, as well as by the detection efficiency and the noise produced by the detector. The detection efficiency is given by the quantum efficiency of the detector, i.e., by the probability that a photon impinging on the detector will actually generate a detection signal. If the detector is operated in the "photon counting" mode, i.e., each photon generates its own detection signal, then the signal-to-noise ratio is essentially derived from the Poisson statistic as $\sqrt{n}$, n denoting the number of detected photons.

When operating a detector in the photon counting mode, the detector's dead time, or delay, is generally problematic. The dead time signifies that time which elapses after a photon is detected, until the detector is again available for detecting a next photon, thus quasi the time that it takes the detector to process an event.

A detector that is recently gaining in popularity is the avalanche photodiode (APD). APDs exhibit the highest detection probability for light having wavelengths of between approximately 200 nm and 1050 nm, so that they are particularly suited for use in the realm of fluorescent light measurements. In addition, APDs offer a high quantum efficiency.

When working with APDs, the dead time is approximately 50 ns, while in the case of photomultipliers it is somewhat less. To ensure that no photons are lost in the photon counting mode and, in addition, to prevent the APDs from being damaged by exposure to too high a level of impinging radiant flux, the radiation impinging on the detector must be kept at low enough levels. For the operation of a fluorescence microscope, this means, for example, that only a very low luminous intensity can be used to excite the sample to be investigated. As a result, a relatively long period of time is needed to record images of a high quality, i.e., to obtain adequate photon statistics. Consequently, rapid biochemical processes in the sample which take place on a time scale that is faster than that of the image recording, are not accessible to conventional fluorescence microscopes.

SUMMARY OF THE INVENTION

It is an object of the present invention to provide a device for detecting photons of a light beam emanating from a spatially limited source using simple means in a way that will enable a higher photon flux to be detected by the detection device, i.e., the maximum counting rate processible by the detection device to be increased.

The present invention provides an apparatus for detecting photons of a light beam emanating from a spatially limited source. The apparatus includes a detection device including a plurality of detectors forming a three-dimensional array. The three-dimensional array includes a first semitranslucent EMCCD disposed behind a second semitranslucent EMCCD. A light splitting device is disposed in a path of rays of the light beam and configured to split the light beam so as to distribute the photons over the detectors for detection.

The realization was made in accordance with the present invention that, when a detector is operated in the photon counting mode, its dead time represents the limiting criterion for the maximum luminous intensity. The realization was also made that the maximum photon flux in the light beam that is detectable in the photon counting mode may be increased by a parallelization, namely by distributing the photons to be detected over a plurality of detectors. To that end, a component for splitting the light beam is provided in the path of rays of the light beam.

The luminous intensity and, associated therewith, the recording speed may be increased by the device according to the present invention in a fluorescence microscope, for example, enabling the images to be created at a faster rate and, thus, even rapidly occurring biological or biochemical reactions in a sample to be made visible. It is likewise possible to achieve a higher image quality in the same recording time, due to increased photon statistics. When n detectors are used, the maximum possible counting rate increases by factor n, and the signal-to-noise ratio improves correspondingly by factor $\sqrt{n}$.

Apart from the photon counting mode, the dynamic range of the detection device is generally increased by the device according to the present invention. The saturation threshold, at which the photon flux impinging on the detection device reaches a level at which any further increase in the flux does not produce a further amplification of the output signal of the detection device, is likewise increased by factor n of the number of individual detectors.

Detectors suited for detecting single photons may advantageously be used, i.e., be operated in the photon counting mode. To that end, the detector is operated in the Geiger mode at a high applied voltage. When a photon impinges on the detector, in the case of an APD, electron hole pairs are generated, and the detector output is at saturation. The voltage signal generated in this manner is tapped off at the detector output and written as an event into an internal memory that is read out once the data acquisition is complete.

Besides the avalanche photodiodes, other detector types, such as photomultipliers or EMCCDs (electron multiplying CCDs) may be used to detect the photons.

A compact design may be provided by arranging the detectors in an array. In the simplest embodiment, this may be a one-dimensional array, for example, in the sense of a linear row array. A broader photon distribution may be achieved by providing a planar array, in which the detectors are arranged in rows and columns.

A three-dimensional array may even be realized by using EMCCDs, namely by arraying individual semitranslucent EMCCDs one behind the other, in a plurality of planes. Impinging photons then penetrate the first plane(s) with a certain probability, and are not detected until reaching a deeper plane of the EMCCDs.

The light beam maybe split in different ways. A splitting process which produces a statistical distribution of the photons is conceivable, for example. Such a photon distribution is able to be easily achieved by a simple defocusing of the light beam, for example by refracting the light beam using a cylindrical lens.

It is also conceivable for the light beam to be split in a way that results in a spectral distribution of the photons. Specifically, a splitting process of this kind may be accomplished by using a prism. In a spectral splitting process, the possibility is very advantageously derived of being able to individually adapt the detectors in the array to a specific spectral region. Photocathodes having different responsivity may be used, for example, as a function of the spectral region.

Besides the components just mentioned for splitting the light beam, in principle, electrooptical elements or electromechanical scanners may also be used. In particular, it is also possible to place a plurality of different components one behind the other in the light beam. This makes it possible to obtain very specific photon distribution patterns, such as, initially a defocusing in one direction to be followed by a spectral splitting in a direction orthogonal thereto.

The requisite threshold sensing device used in the counting of photons, as well as an electronic counter for counting the detected photon events may advantageously be placed close to the detector. In particular, when using EMCCDs, the counter may even be mounted directly on the chip.

An appropriate counting logic for counting the detected photon events may advantageously be programmed into an FPGA (field progammable gate array). Adders may be provided upstream, as well as downstream of the counter. Moreover, the entire electronics may have a monolithic design.

BRIEF DESCRIPTION OF THE DRAWINGS

The teaching of the present invention may be advantageously embodied and further refined in various ways. The present invention is elaborated upon below based on exemplary embodiments with reference to the drawings. The drawings schematically show.

DETAILED DESCRIPTION

Figure 1:
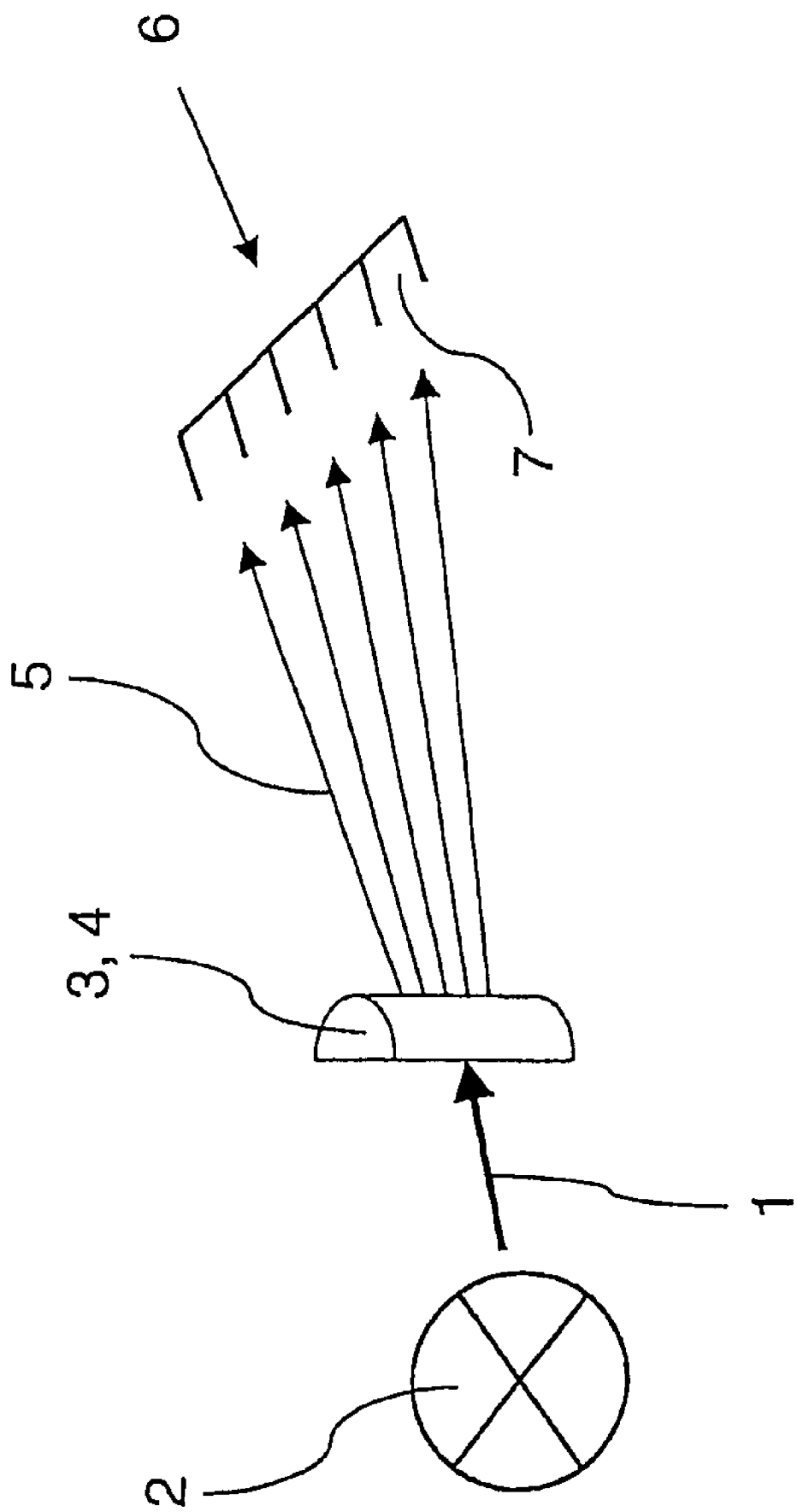
FIG. 1: shows a first exemplary embodiment of the device according to the present invention, featuring a splitting of the light beam resulting in a statistical photon distribution in one direction, and a one-dimensional detector array.

FIG. 1 depicts a light beam 1 emanating from a spatially limited light source 2; specifically, light source 2 may be a biological sample material excited to emit fluorescence. Light beam 1 impinges on an optical component 3 which is made of a transparent material and is designed as a semicylindrical lens 4. Light beam 1 propagates through cylindrical lens 4 and, upon emergence from lens 4, is defocused due to refraction, thereby producing a divergent light beam 5 within a plane of illumination, whose surface normal is the cylinder axis. The photons are statistically distributed within the plane of illumination.

Widened light beam 5 then impinges on a detection device which includes a plurality of detectors 7 that form an array 6. FIG. 1 shows exemplarily merely five detectors 7, which are combined to form a one-dimensional array 6. Since the photons of light beam 1 are not detected in one detector, but rather are uniformly distributed over altogether five detectors 7, the maximum possible counting rate—and thus the maximum luminous intensity—is increased by a factor of 5, as a function of the number of detectors 7 of array 6. The signal-to-noise ratio improves correspondingly by factor $\sqrt{5}$. Thus, given a constant integration time per pixel, the signal-to-noise ratio is clearly improved.

Figure 2:
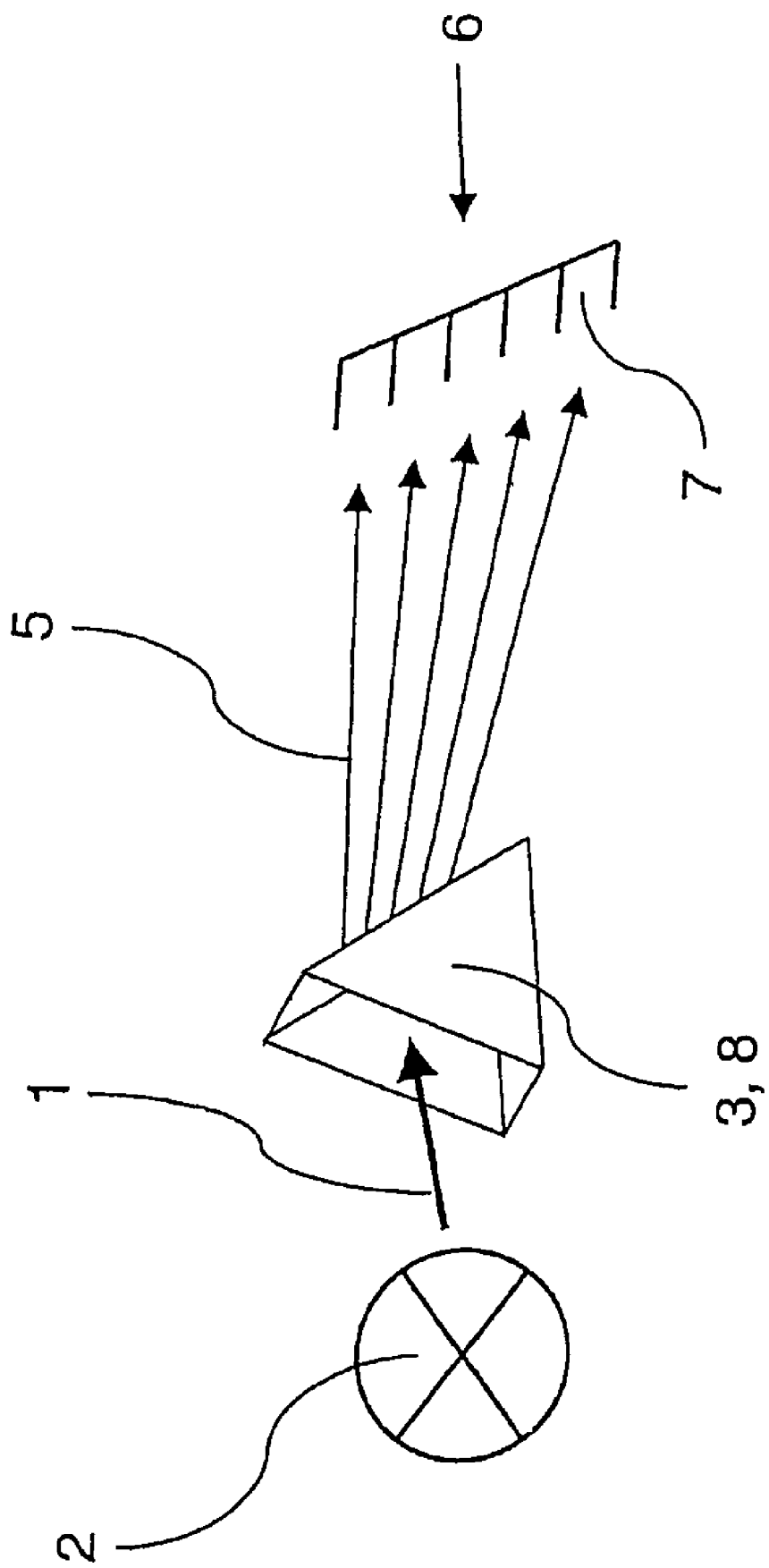
FIG. 2: depicts a second exemplary embodiment of the device according to the present invention, featuring a splitting of the light beam resulting in a spectral photon distribution in one direction, and a one-dimensional detector array.

FIG. 2 illustrates a specific embodiment in which, instead of a statistical photon distribution, a spectral photon distribution is generated. The splitting into spectrally different channels in one dimension is accomplished by a prism 8 positioned in the path of rays of light beam 1. Prism 8 may be rotated to optimally adapt the spectral splitting to the particular configuration of detector array 6.

Figure 3:
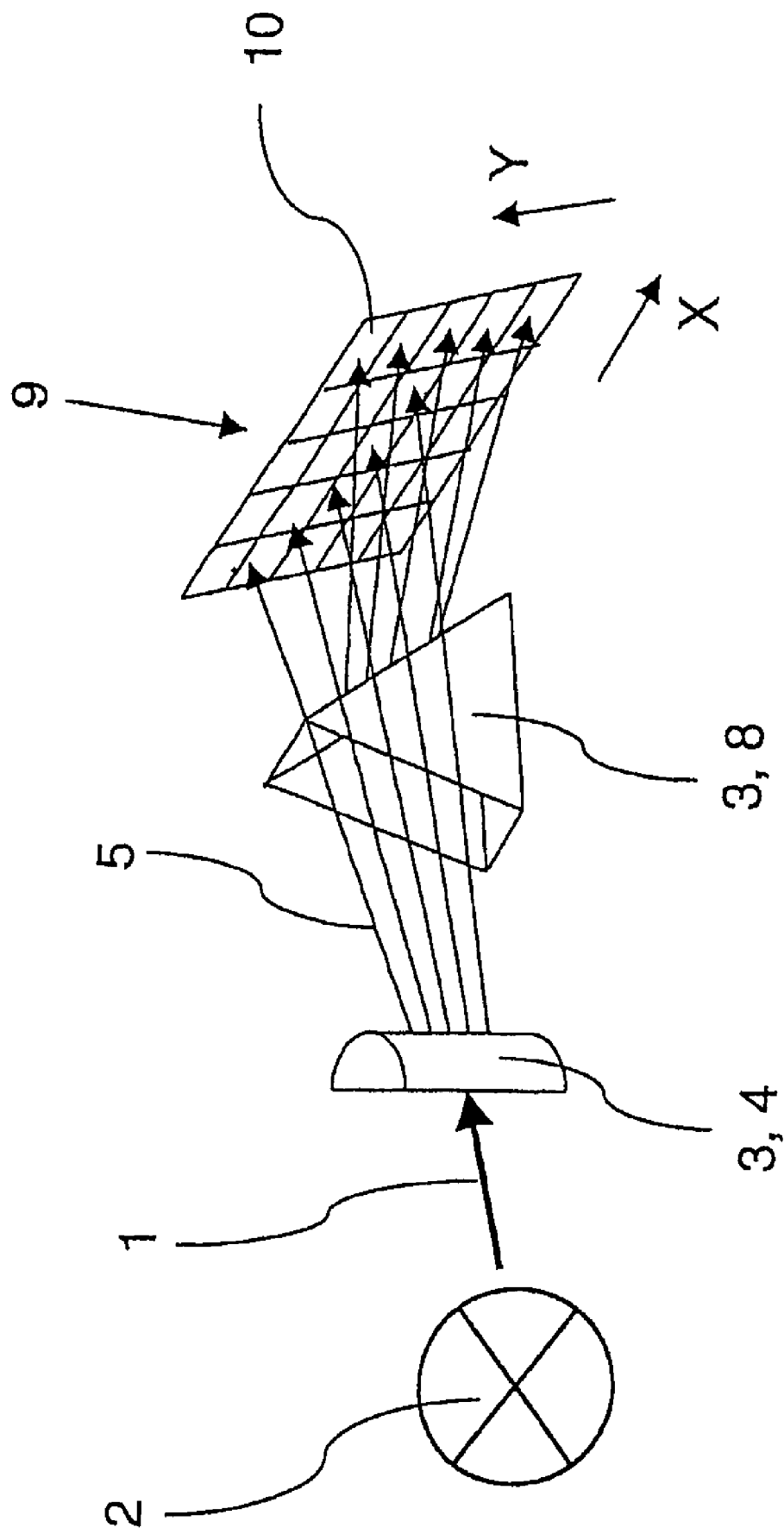
FIG. 3: illustrates a third exemplary embodiment of the device according to the present invention featuring a splitting of the light beam into two directions, and a two-dimensional detector array.

FIG. 3 shows a specific embodiment in which light beam 1 emanating from light source 2 is initially split in one direction (X direction) by a cylindrical lens 4, analogously to the above explanations pertaining to FIG. 1. Widened light beam 5 then impinges on a prism 8 which spectrally splits beam 5 in a direction (Y direction) that is orthogonal to the X direction. Disposed downstream of prism 8 is the detection device which is constituted of a two-dimensional detector array 9. While the photons impinging on detector array 9 are uniformly distributed in the X direction, a spectral distribution is produced in the Y direction, the less energetic photons impinging on upper pixels 10 in FIG. 3 and the more energetic photons impinging on lower pixels 10.

Figure 4:
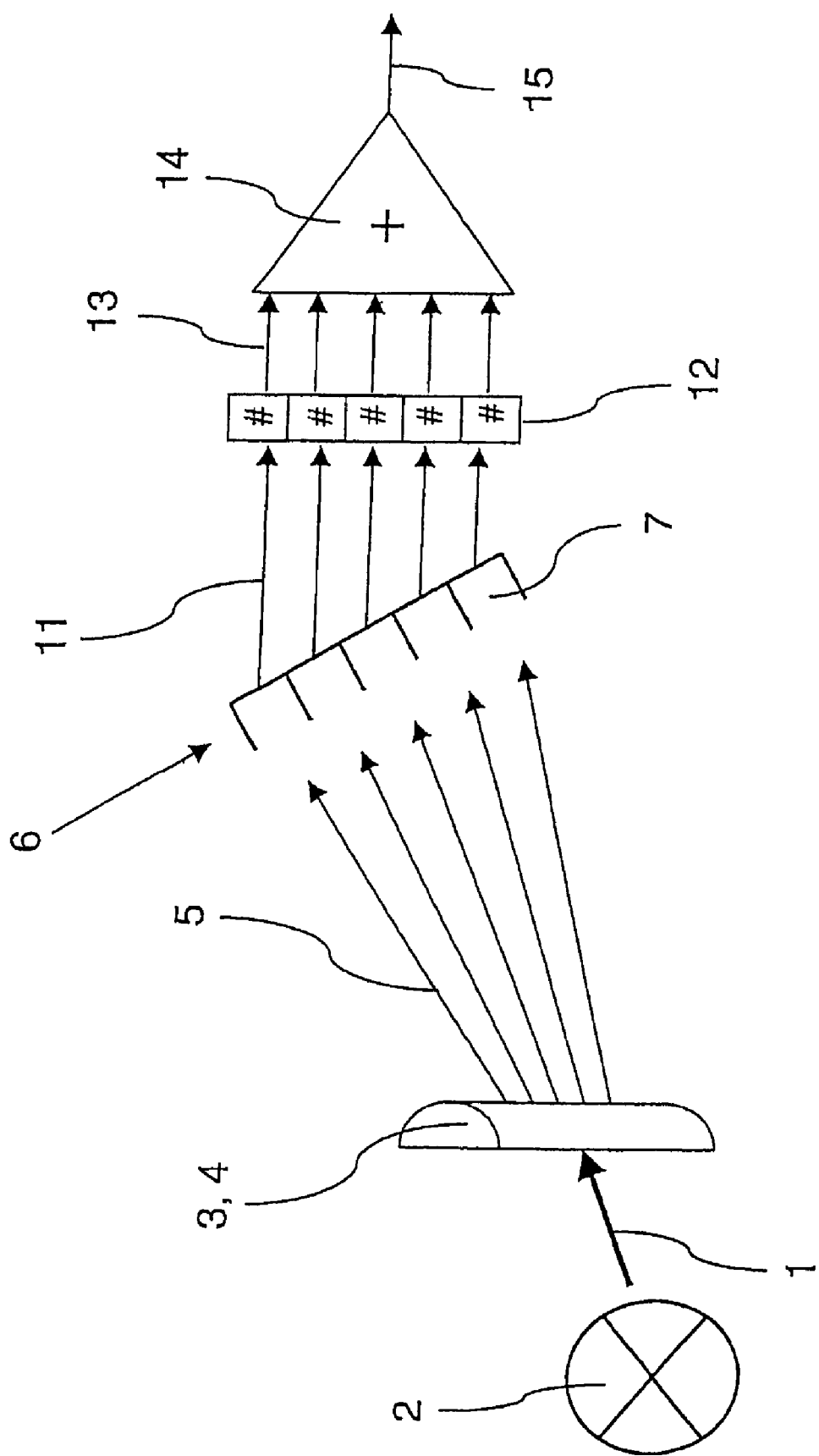
FIG. 4: reveals the exemplary embodiment of FIG. 1, the associated processing electronics also being shown.

Finally, in a schematic view, FIG. 4 shows the specific embodiment of the device according to the present invention in accordance with FIG. 1, featuring a statistical splitting of light beam 1 in one direction and a one-dimensional detector array 6. Also shown is the signal-processing electronics. Assigned to each detector 7 of detector array 6 via an electrical connection 11 is a photon counter 12, thereby enabling the photon events to be read out and counted pixel by pixel. The outputs of photon counters 12 are fed via electrical connections 13 to an adder 14 which sums the detected photon events of entire detector array 6. The counting rate produced in this manner is generated as output signal 15.

Finally, it is particularly emphasized that the above, entirely arbitrarily selected exemplary embodiments are merely intended for purposes of discussing the teaching of the present invention, but not for limiting it to such embodiments.

What is claimed is:

1. An apparatus for detecting photons of a light beam emanating from a spatially limited source, the apparatus comprising:
    a detection device including a plurality of detectors forming a three-dimensional array including a first semi-translucent EMCCD disposed behind a second semi-translucent EMCCD; and
    a light splitting device disposed in a path of rays of the light beam and configured to split the light beam so as to distribute the photons over the detectors for detection.

2. The apparatus as recited in claim 1 wherein the light beam is a light beam of a fluorescence microscope.

3. The apparatus as recited in claim 1 wherein the plurality of detectors is configured to detect single photons to as to provide single photon counting.

4. The apparatus as recited in claim 1 wherein the plurality of detectors includes at least one of an avalanche photodiode, a photomultiplier and an EMCCD.

5. The apparatus as recited in claim 1 wherein the plurality of detectors forms at least one of a one-dimensional and a two-dimensional array.

6. The apparatus as recited in claim 1 wherein the light splitting device is configured to split the light beam so as to statistically distribute the photons.

7. The apparatus as recited in claim 6 wherein the light splitting device is configured to statistically distribute the photons in a defocusing process.

8. The apparatus as recited in claim 1 wherein the light splitting device includes a cylindrical lens.

9. The apparatus as recited in claim 1 wherein the light splitting device is configured to split the light beam so as to spectrally distribute the photons.

10. The apparatus as recited in claim 1 wherein the light splitting device includes a prism.

11. The apparatus as recited in claim 1 wherein the light splitting device includes at least one of an electrooptical element and an electromechanical scanner.

12. The apparatus as recited in claim 1 wherein the light splitting device includes a plurality of light splitting components.

13. The apparatus as recited in claim 1 further comprising an electronic counter disposed in a vicinity of the detection device and configured to count photons.

14. The apparatus as recited in claim 1 wherein the electronic counter is disposed on a chip of an EMCCD.

15. The apparatus as recited in claim 1 further comprising an FPGA programmed with a counting logic for counting photons.

16. The apparatus as recited in claim 13 further comprising an adder connected upstream or downstream of the electronic counter.

17. The apparatus as recited in claim 15 further comprising an adder connected upstream or downstream of the FPGA.

18. The apparatus as recited in claim 1 further comprising associated electronics having a monolithic design.

* * * * *